Figure 1:
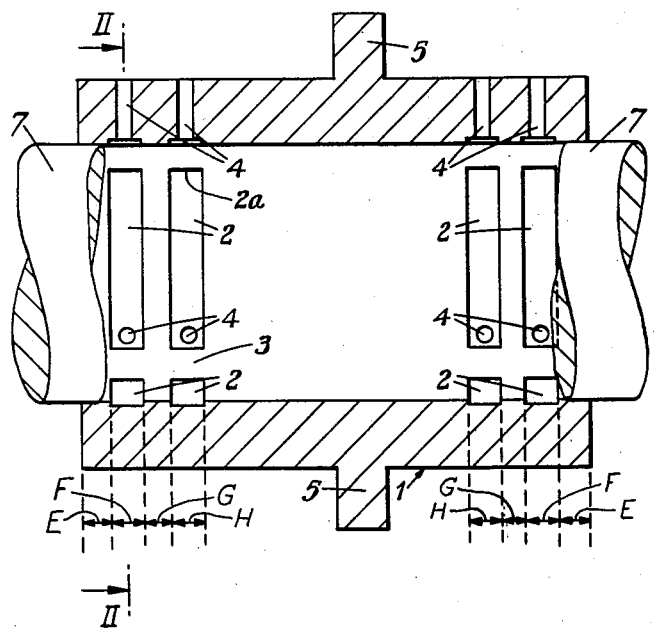

Feb. 26, 1963 S. WHITLEY ETAL 3,079,203
JOURNAL AND JOURNAL BEARING ASSEMBLIES
Filed Nov. 2, 1959 2 Sheets-Sheet 1

INVENTORS
STANLEY WHITLEY
DAVID SHAUN ALLEN

BY *Lawson and Taylor*

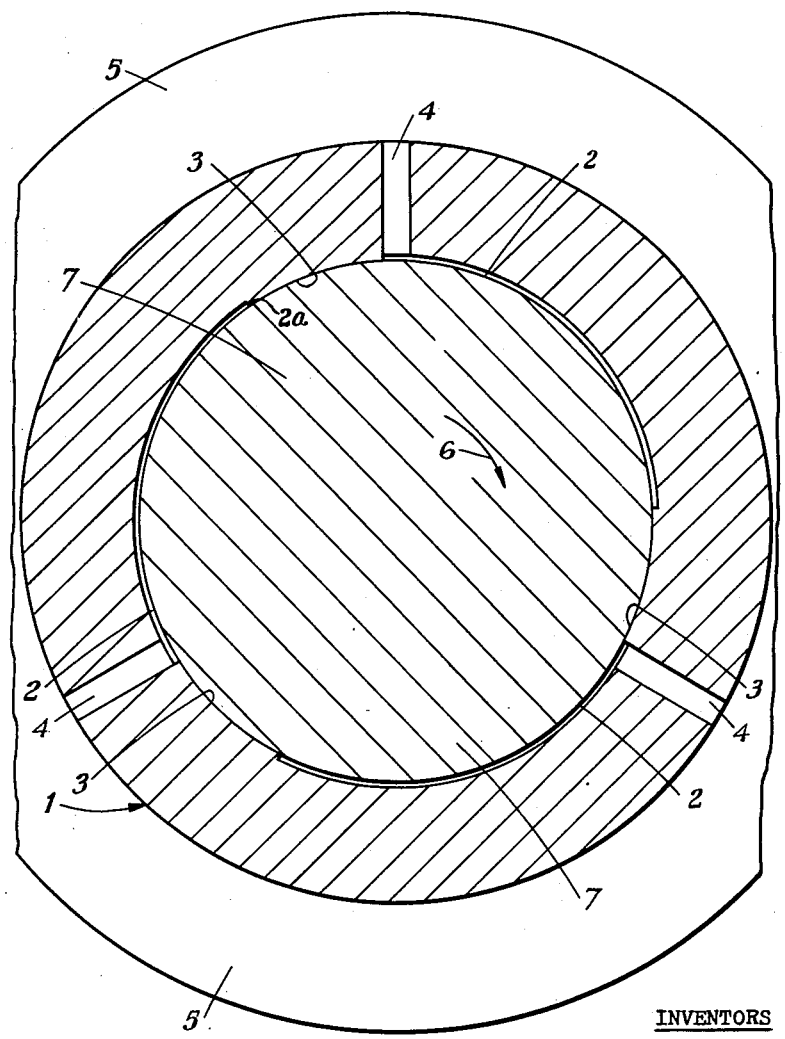

United States Patent Office 3,079,203
Patented Feb. 26, 1963

3,079,203
JOURNAL AND JOURNAL BEARING ASSEMBLIES
Stanley Whitley, Great Saughall, Chester, and David Shaun Allen, Bromborough, Wirral, England, assignors to United Kingdom Atomic Energy Authority, London, England
Filed Nov. 2, 1959, Ser. No. 850,324
Claims priority, application Great Britain Nov. 7, 1958
2 Claims. (Cl. 308—9)

This invention relates to gas lubricated journal and journal bearing assemblies.

A general problem in the field of operating journal and journal bearing assemblies is that of the avoidance of whirl. This problem has especial importance when gas lubrication is used since a gas lubricating film is more easily broken by whirl than a liquid lubricating film, thereby giving rise to rubbing between the journal and the journal bearing.

One method of suppressing whirl in a gas lubricated journal and journal bearing assembly is to feed pressurised gas through two spaced lateral ducts in the journal bearing which open to the journal space at the bearing surface, thereby imposing a lateral gas pressure on the journal. This method requires a source of pressurised gas to feed the ducts.

The invention resides in a gas lubricated journal and journal bearing assembly wherein the journal and journal bearing have defined between them at each end of the assembly three or more part-circumferential viscosity grooves, the grooves each having at corresponding ends thereof a hole providing communication between the grooves and the atmosphere ambient to the assembly.

In a preferred form of the invention two rings of grooves are provided at each end of the assembly, each ring having three equi-spaced grooves, the grooves being defined in the bearing surface of the journal bearing.

The journal may be in the form of a shaft with the journal bearing in the form of a sleeve around the shaft.

Alternatively, the journal may be in the form of a hollow shaft with the journal bearing in the form of a shaft within the hollow shaft.

By way of example, the invention will now be described with reference to the accompanying drawings in which FIG. 1 is a sectional elevation and FIG. 2 is a section on the line II—II of FIG. 1 on an enlarged scale.

In the drawings a gas lubricated journal bearing 1 in the form of a sleeve has a cylindrical bearing surface with two rings of three equi-spaced arcuate viscosity grooves 2 at each end of the bearing. The grooves 2 in each ring each have a step 2a and are separated by lands 3. Each groove 2 has at one end a hole 4. The bearing 1 has a coupling flange 5. Each groove 2 extends over an arc of 86°, the three holes 4 for the three grooves in one ring being 120° apart.

With a journal in the form of a shaft 7 rotating in the bearing 1 in the direction indicated by arrow 6 at a speed sufficient to maintain a gas lubricating film between the shaft and the bearing, the grooves 2 give rise to a pumping action, gas being drawn in at the holes 4 and pumped along the grooves 2 to give localised points of increased pressure at the lands 3 thereby suppressing whirl.

The journal bearing described above requires no pressurised source of gas and has been found to give good whirl suppression coupled with good lift.

Typical dimensions for a four inch long by two inch internal diameter and three inch external diameter bearing are as follows (see FIG. 1 for dimensions referred to as E, F, G, H).

E, F, G and H each=0.187 inch
Diameter of holes 4=0.125 inch
Depth of grooves 2=0.0007 inch
Diametral clearance between shaft and bearing=0.001 inch A journal bearing of the above dimensions has a load carrying capacity of 50 lbs. at an eccentricity ratio of 0.5 using nitrogen as lubricant at 6,000 r.p.m. The whirl speed is about 50% higher than for an ungrooved journal bearing of the same size.

In an alternative form the journal is in the form of a hollow shaft and the journal bearing is in the form of a stationary shaft within the hollow shaft. In this form, the viscosity grooves are provided on the surface of the stationary shaft, the holes at the end of the grooves communicating with the ends of the stationary shaft via passageways in the stationary shaft.

We claim:
1. A gas lubricated journal and journal bearing assembly wherein the journal bearing has a cylindrical bearing surface having defined therein at each end of the assembly at least one ring of three or more circumferentially extending shallow grooves each having a width less than the arcuate length and each terminating abruptly to create a step, the grooves occupying corresponding arcuate positions in all the rings and the grooves each having at corresponding ends thereof a hole providing free communication between the grooves and the atmosphere ambient to the assembly.

2. A gas lubricated journal and journal bearing assembly as claimed in claim 1, wherein there are two rings of grooves at each end of the assembly, each ring having three equi-spaced grooves and each groove extending over an arc of 86°.

References Cited in the file of this patent
UNITED STATES PATENTS

| | | |
|---|---|---|
| 2,811,109 | Brill et al. | Oct. 29, 1957 |
| 2,899,243 | Acterman | Aug. 11, 1959 |

FOREIGN PATENTS

| | | |
|---|---|---|
| 716,522 | Great Britain | Oct. 6, 1954 |